United States Patent
Huang

(10) Patent No.: US 6,681,492 B1
(45) Date of Patent: Jan. 27, 2004

(54) TREE PRUNER PROVIDED WITH MEANS TO FACILITATE A SERIES OF CONTINUOUS SCISSORS ACTIONS ON THE SAME INCISION

(76) Inventor: Yao-Chung Huang, No. 2, Alley 1, Lane 722, Sec. 4, Yen Hai Road, Fu Shing Hsiang, Chang Hua Hsien (TW)

( * ) Notice: Subject to any disclaimer, the term of this patent is extended or adjusted under 35 U.S.C. 154(b) by 59 days.

(21) Appl. No.: 10/189,311

(22) Filed: Jul. 5, 2002

(51) Int. Cl.⁷ .............................................. B26B 13/00
(52) U.S. Cl. ............................. 30/250; 30/192; 30/249
(58) Field of Search .................. 30/186, 187, 188, 30/192, 244, 245, 246, 249, 250

(56) References Cited

U.S. PATENT DOCUMENTS

| | | | | |
|---|---|---|---|---|
| 107,577 A | * | 9/1870 | Will ............................ | 30/250 |
| 508,022 A | * | 11/1893 | Kamphasu ................... | 30/250 |
| 3,210,844 A | * | 10/1965 | Tontscheff ................... | 30/250 |
| 5,184,404 A | * | 2/1993 | Chen ............................ | 30/250 |
| 5,570,510 A | * | 11/1996 | Linden ........................ | 30/250 |
| 5,689,888 A | * | 11/1997 | Linden ........................ | 30/250 |
| 6,345,446 B1 | * | 2/2002 | Huang ......................... | 30/250 |
| 2003/0136008 A1 | * | 7/2003 | Lin .............................. | 30/250 |

* cited by examiner

*Primary Examiner*—Hwei-Siu Payer
(74) *Attorney, Agent, or Firm*—Harrison & Egbert

(57) ABSTRACT

A tree pruner includes a first handle, a second handle, a fixed jaw plate, a movable jaw plate, a gear, a check plate, and a push plate. The movable jaw plate is actuated by the gear to bring about a first scissors action in conjunction with the fixed jaw plate at such time when the second handle is swivelled toward the fixed jaw plate such that the gear is pushed by the push plate to turn. The gear is arrested by the check plate so as to keep the movable jaw plate in the stationary state to facilitate a series of continuous scissors actions, with the cutting edge of the movable jaw plate remaining in the incision made into a tree twig during the first scissors action.

1 Claim, 11 Drawing Sheets

TREE PRUNER PROVIDED WITH MEANS TO FACILITATE A SERIES OF CONTINUOUS SCISSORS ACTIONS ON THE SAME INCISION

FIELD OF THE INVENTION

The present invention relates generally to a gardening implement, and more particularly to a tree pruner capable of a series of continuous scissors actions to facilitate the removing of dead or living twigs of a tree or shrub.

BACKGROUND OF THE INVENTION

As shown in FIG. 1, a tree pruner of the prior art comprises two handles 11 which are pivoted together by a pivoting member 12 and are provided at one end thereof with a blade 10 fastened therewith. A tree twig is put between the two blades 10 and is then cut by the scissors action of the two blades 10 at the time when the two handles 11 are moved toward each other, as illustrated in FIG. 2. In the event that the tree twig is not severed by one scissors action, a second scissors action is called for. In order to execute the second scissors action, the two handles 11 must be moved away from each other at the same time, thereby causing the cutting edges of the two blades 10 to move away from the incision made into the tree twig during the first scissors action. It is conceivably inconvenient and time-consuming for an operator to put the displaced cutting edges back to the original incision before the second scissors action is effected. Without putting the displaced cutting edges of the blades 10 back to the original incision, the operator is likely to relocate the incision. The relocation of the incision often results in a waste of energy and time as well as a failure in attaining the pruning objective that is intended.

BRIEF SUMMARY OF THE INVENTION

The primary objective of the present invention is to provide a tree pruner which is free of the shortcomings of the prior art tree pruner described above.

In keeping with the principle of the present invention, the foregoing objective of the present invention is attained by a tree pruner comprising two handles, a fixed jaw plate, a movable jaw plate, a gear, a check plate, and a push plate. In the act of effecting the first scissors action, the check plate and the push plate are engaged with the gear, thereby causing the movable jaw plate to turn counterclockwise such that the blade of the movable jaw plate moves toward the jaw portion of the fixed jaw plate. In effecting the second scissors action, one of the two handles is moved away from other one of the two handles, thereby causing the check plate to prevent the gear from turning counterclockwise. In the meantime, the movable jaw plate remains stationary such that the cutting edge of the blade of the movable jaw plate remains in the incision made into the tree twig in the first scissors action.

The features and the advantages of the present invention will be more readily understood upon a thoughtful deliberation of the following detailed description of the present invention with reference to the accompanying drawings.

DETAILED DESCRIPTION OF THE INVENTION

Figure 1:
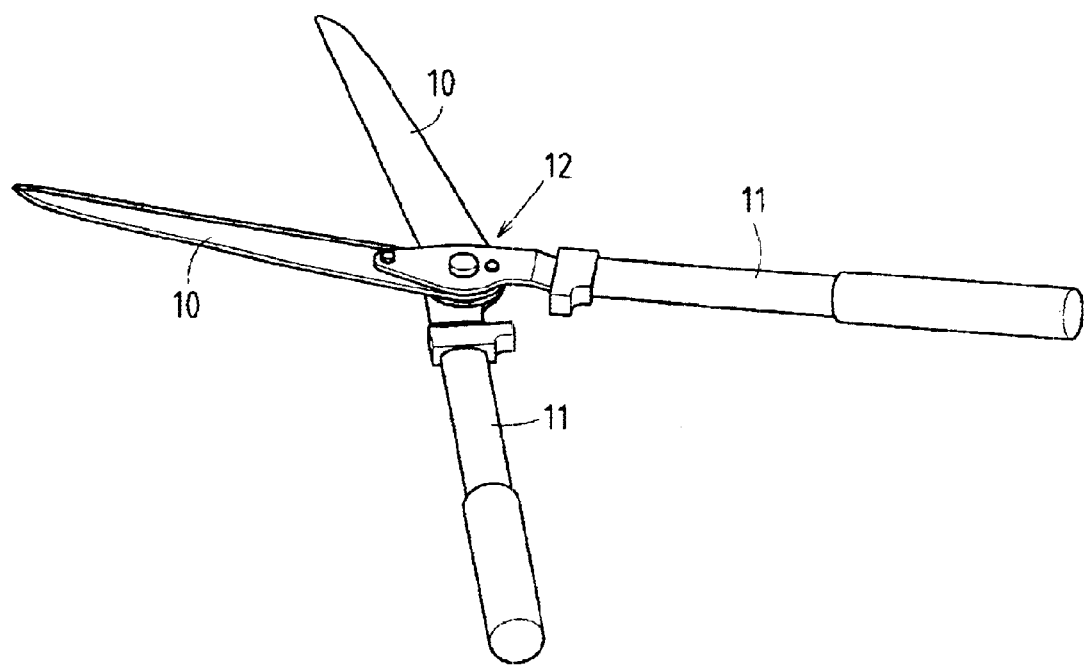
FIG. 1 shows a perspective view of a prior art tree pruner.
Figure 2:
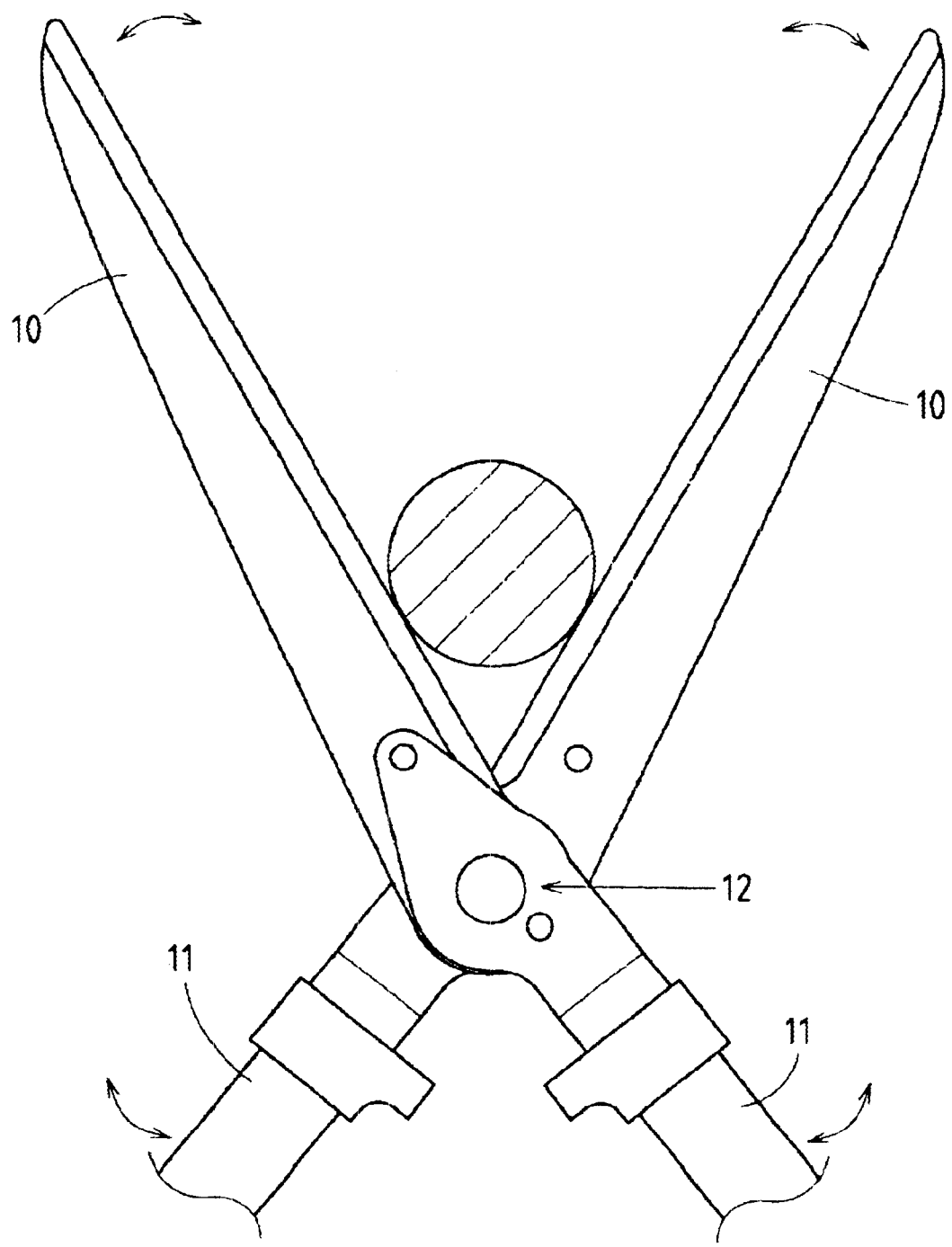
FIG. 2 shows a schematic view of the prior art tree prune in action.
Figure 3:
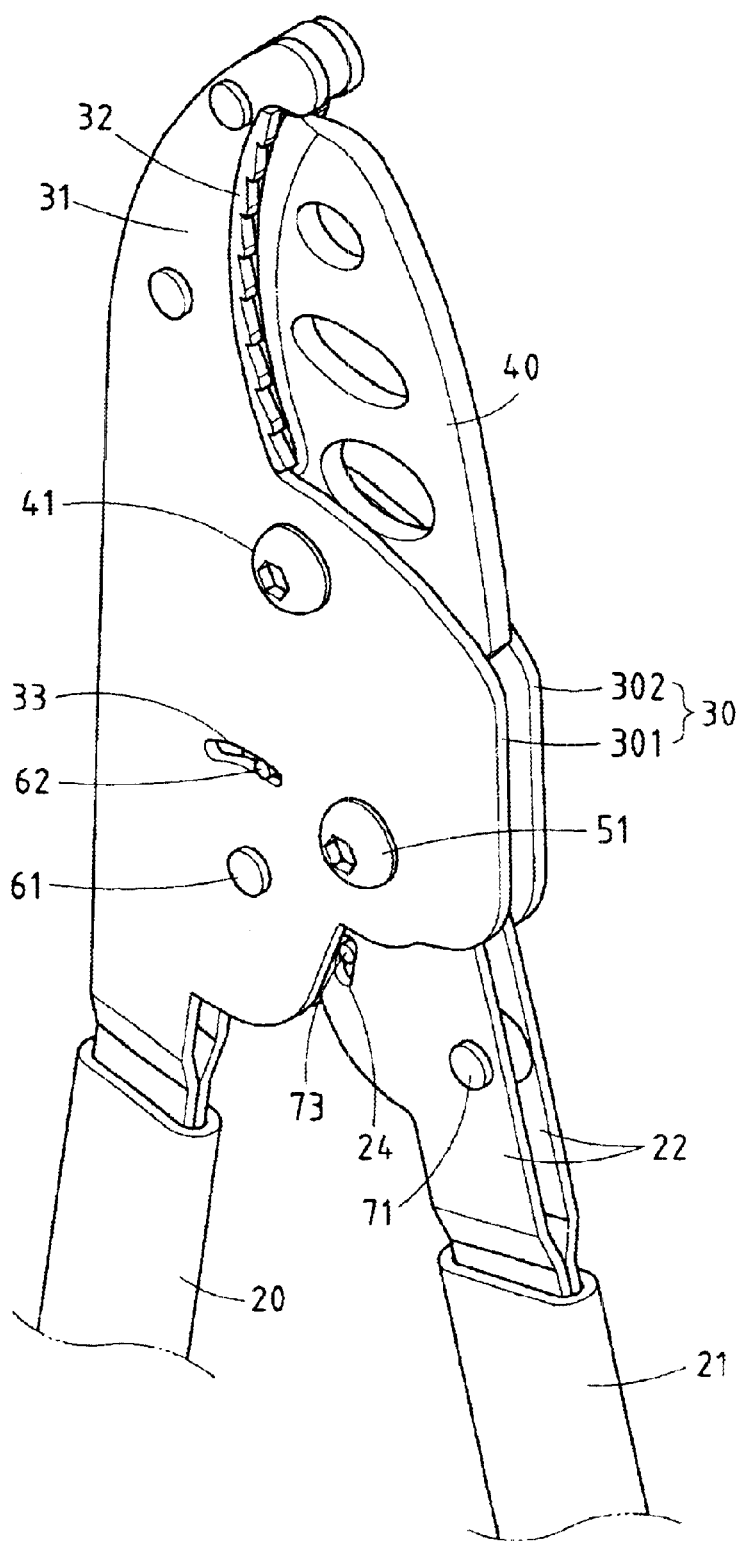
Figure 4:
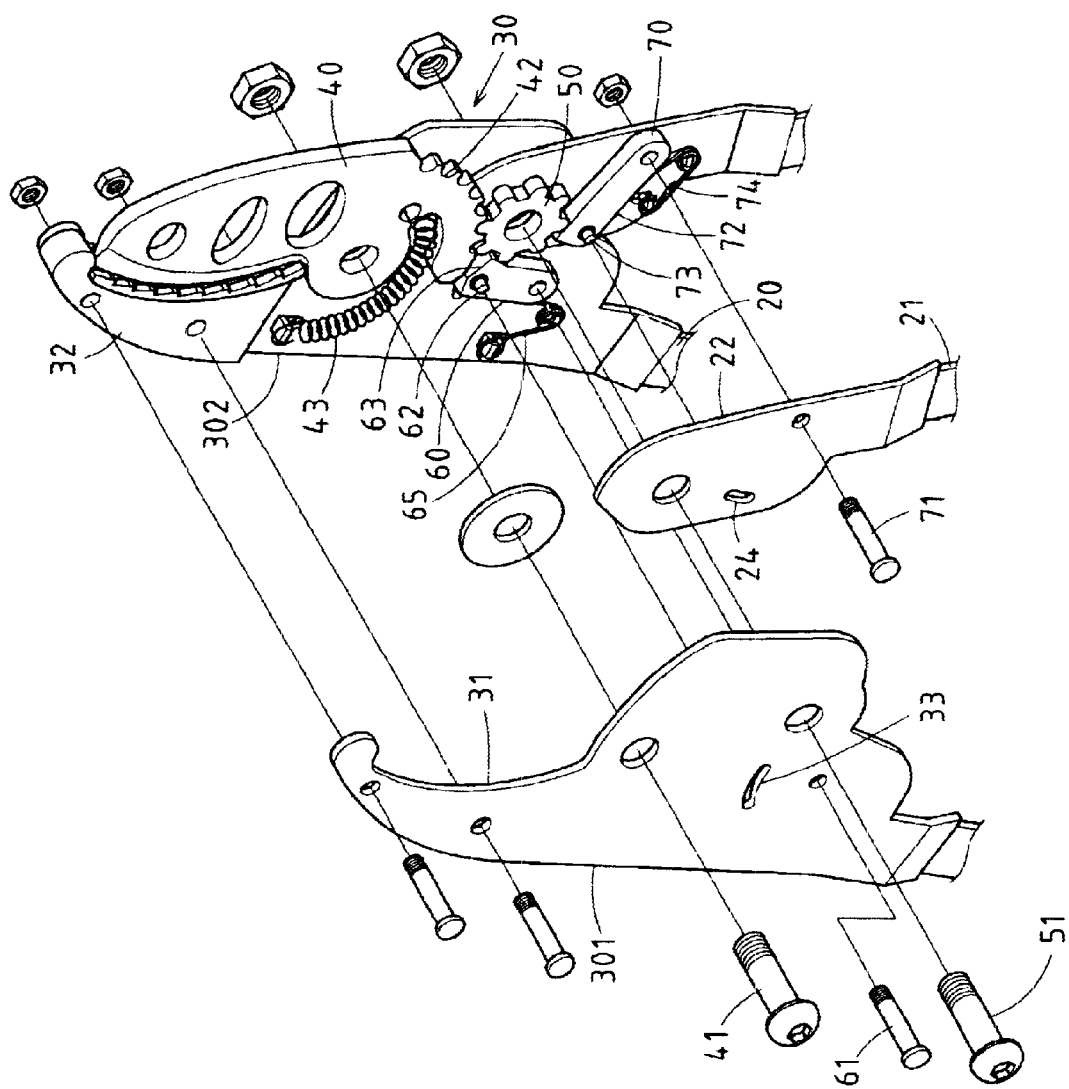
FIG. 4 shows a first exploded perspective view of the present invention.
Figure 5:
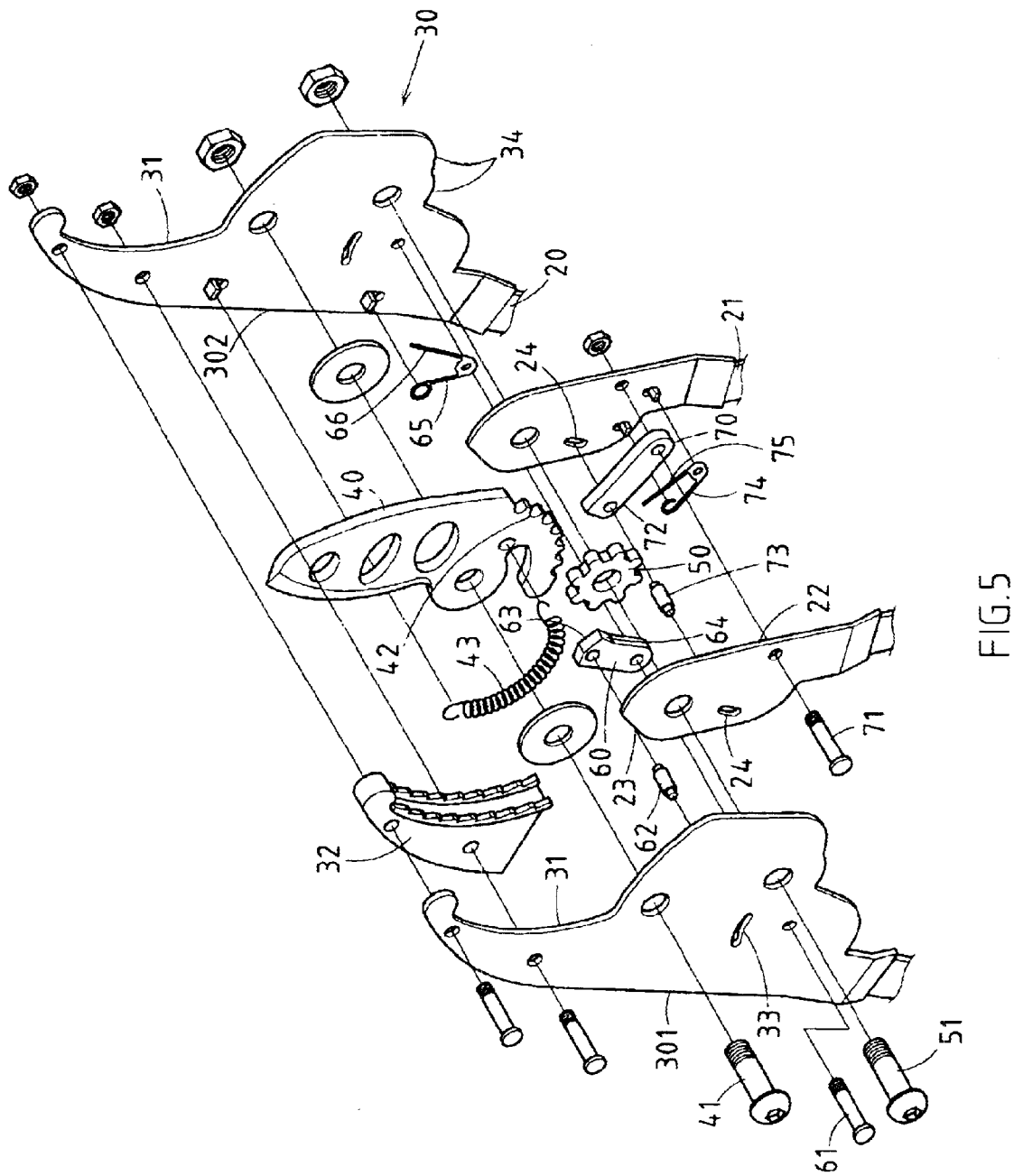
FIG. 5 shows a second exploded perspective view of the present invention.
Figure 6:
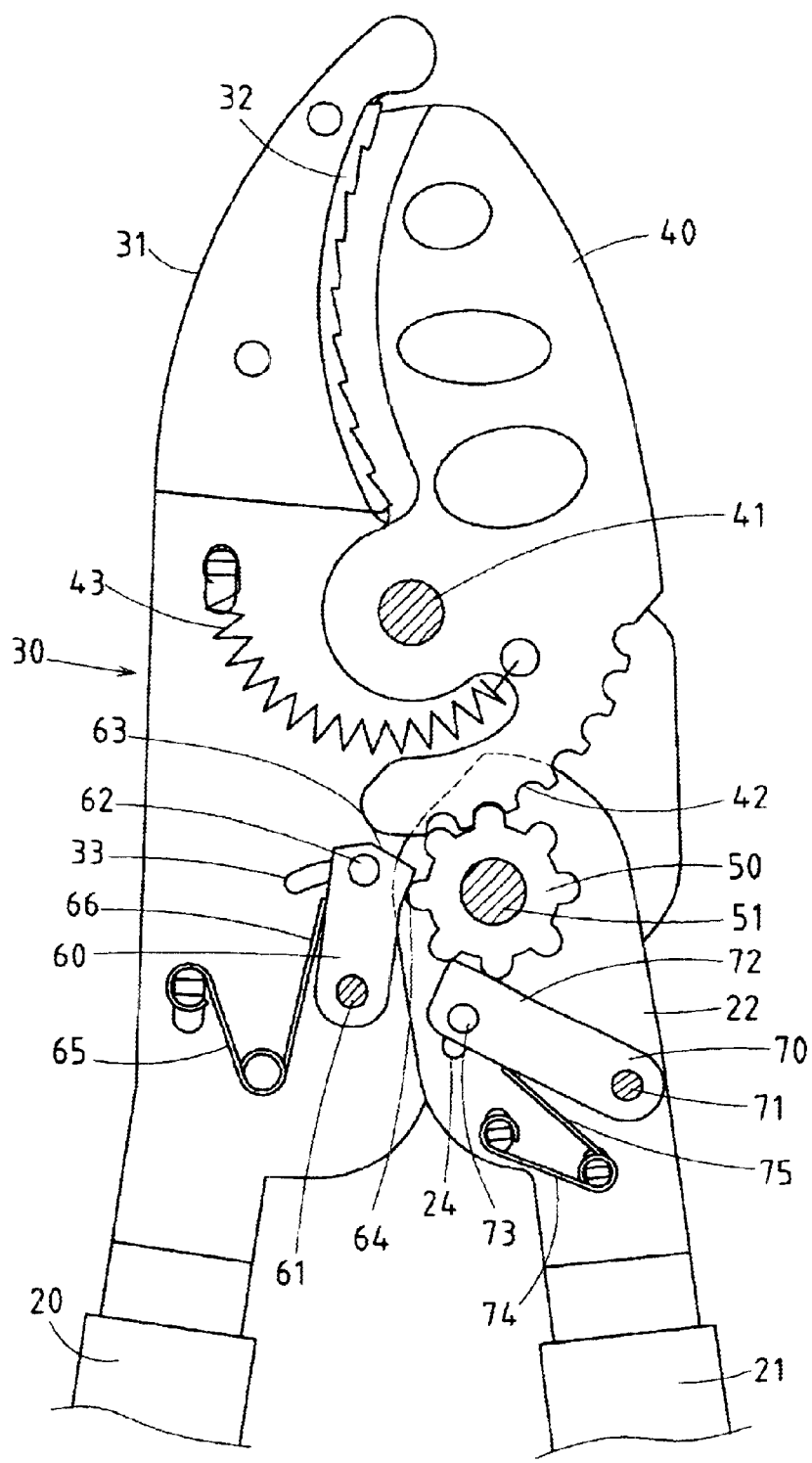
FIGS. 6–10 are schematic views of the present invention in action.
Figure 7:
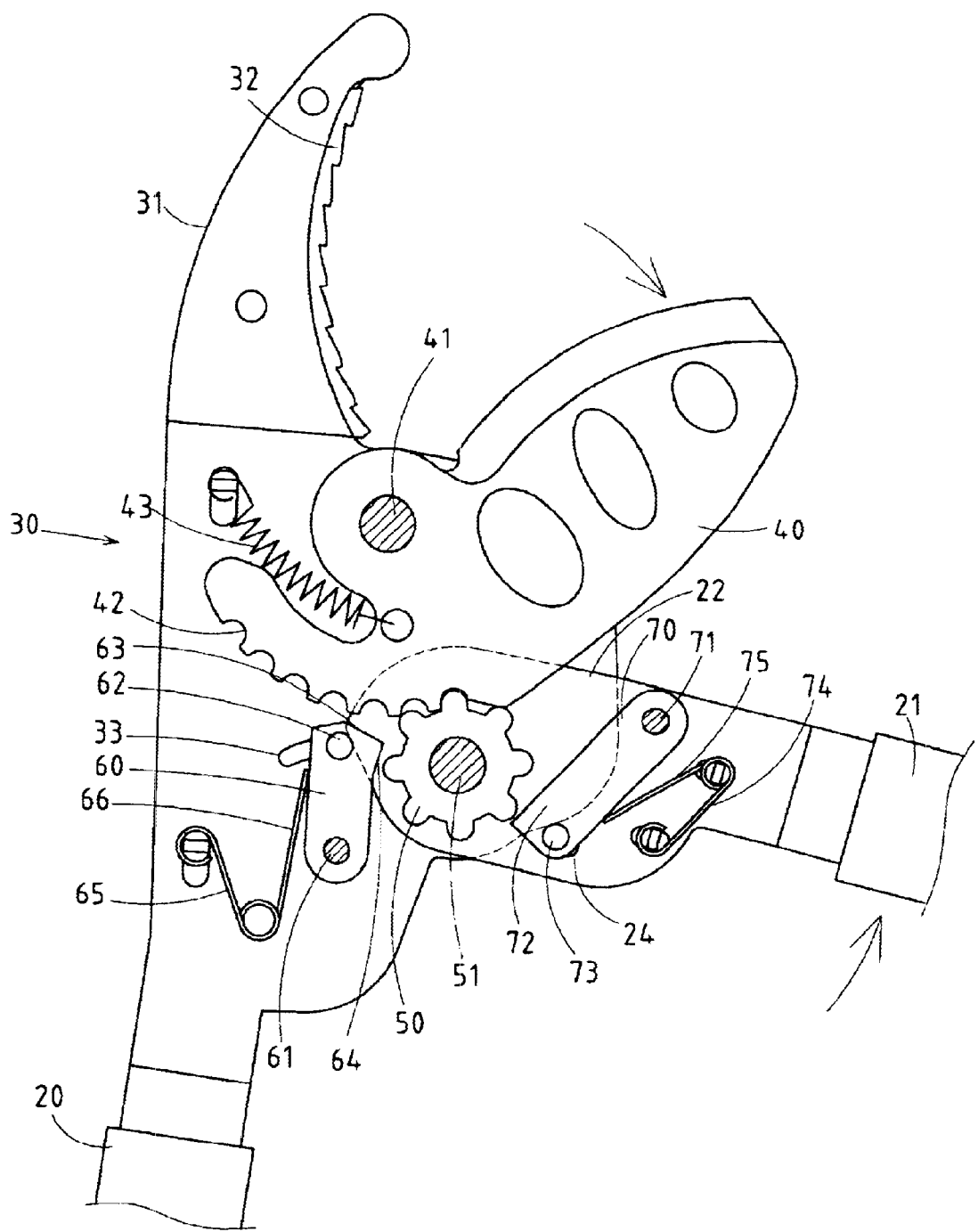
Figure 8:
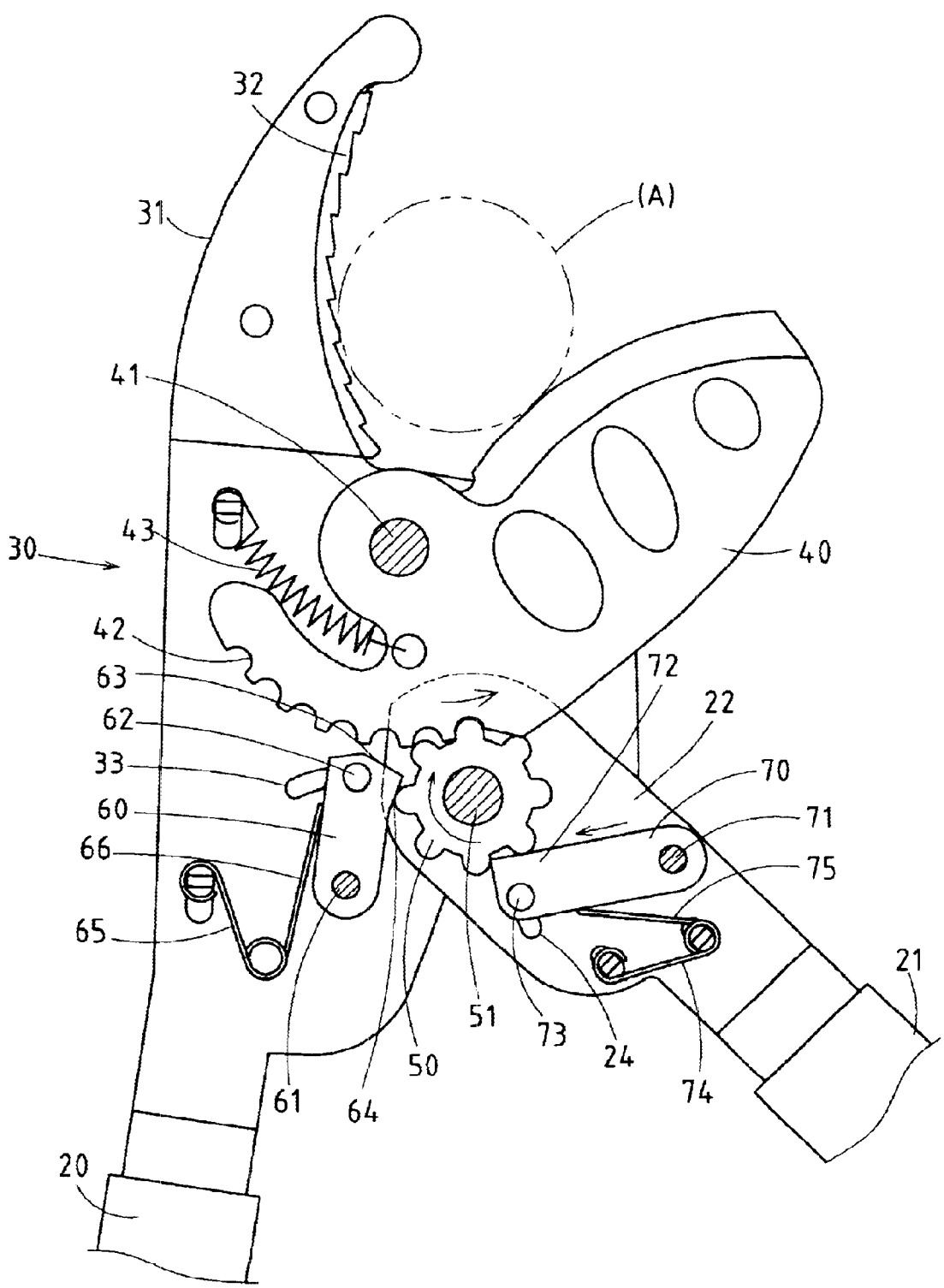

As shown in FIGS. 3–10, a tree pruner embodied in the present invention comprises two handles 20, 21, a fixed jaw plate 30, a movable jaw plate 40, a gear 50, a check plate 60, and a push plate 70.

The fixed jaw plate 30 is formed of two metal pieces 301 and 302 which are identical in shape and thickness and are arranged oppositely at an interval on the top end of the first handle 20. The fixed jaw plate 30 has a top jaw portion 31 which is provided with a serrated edge 32.

The movable jaw plate 40 is fastened pivotally at the midsegment with the fixed jaw plate 30 by a first pivot 41 such that the movable jaw plate 40 is opposite to the top jaw portion 31 of the fixed jaw plate 30. The movable jaw plate 40 has an arcuate bottom end with the first pivot 41 serving as its circular center. The arcuate bottom end is provided with a toothed edge 42. A recovery spring 43 is fastened between the movable jaw plate 40 and the fixed jaw plate 30.

The gear 50 is rotatably mounted on a second pivot 51 which is pivoted to a top end 22 of the second handle 21. The gear 50 is engaged with the toothed edge 42 of the movable jaw plate 40.

The check plate 60 is pivoted to the fixed jaw plate 30 by a third pivot 61 such that the check plate 60 is contiguous to the gear 50. The check plate 60 is provided at a movable end with a projection 62, which is slidably received in a first confining slot 33 for confining the swiveling of the check plate 60. The projection 62 is pushed by a push edge 23 of the top end 22 of the second handle 21, thereby causing the check plate 60 to swivel outwards. The check plate 60 is provided with a counterclockwise stop edge 63 and a clockwise guide edge 64. The check plate 60 is provided with a torsion spring 65 with one end 66 thereof urging the check plate 60 so as to enable the movable end of the check plate 60 to engage the gear 50, thereby enabling the gear 50 to turn in the clockwise direction to pass the guide edge 64 and causing the gear 50 to be stopped by the counterclockwise stop edge 63.

The push plate 70 is pivoted with the second handle 21 by a fourth pivot 71 such that the push plate 70 is contiguous to the gear 50. The push plate 70 has a movable end 72 which is provided with a pillar 73. The pillar 73 is slidably received in a second confining slot 24 of the top end 22 of the second handle 21 so as to confine the swiveling of the push plate 70. The push plate 70 is provided with a torsion spring 74 fastened therewith such that one end 75 of the torsion spring 74 urges the push plate 70, thereby enabling the movable end 72 of the push plate 70 to come in contact with the gear 50.

Figure 9:
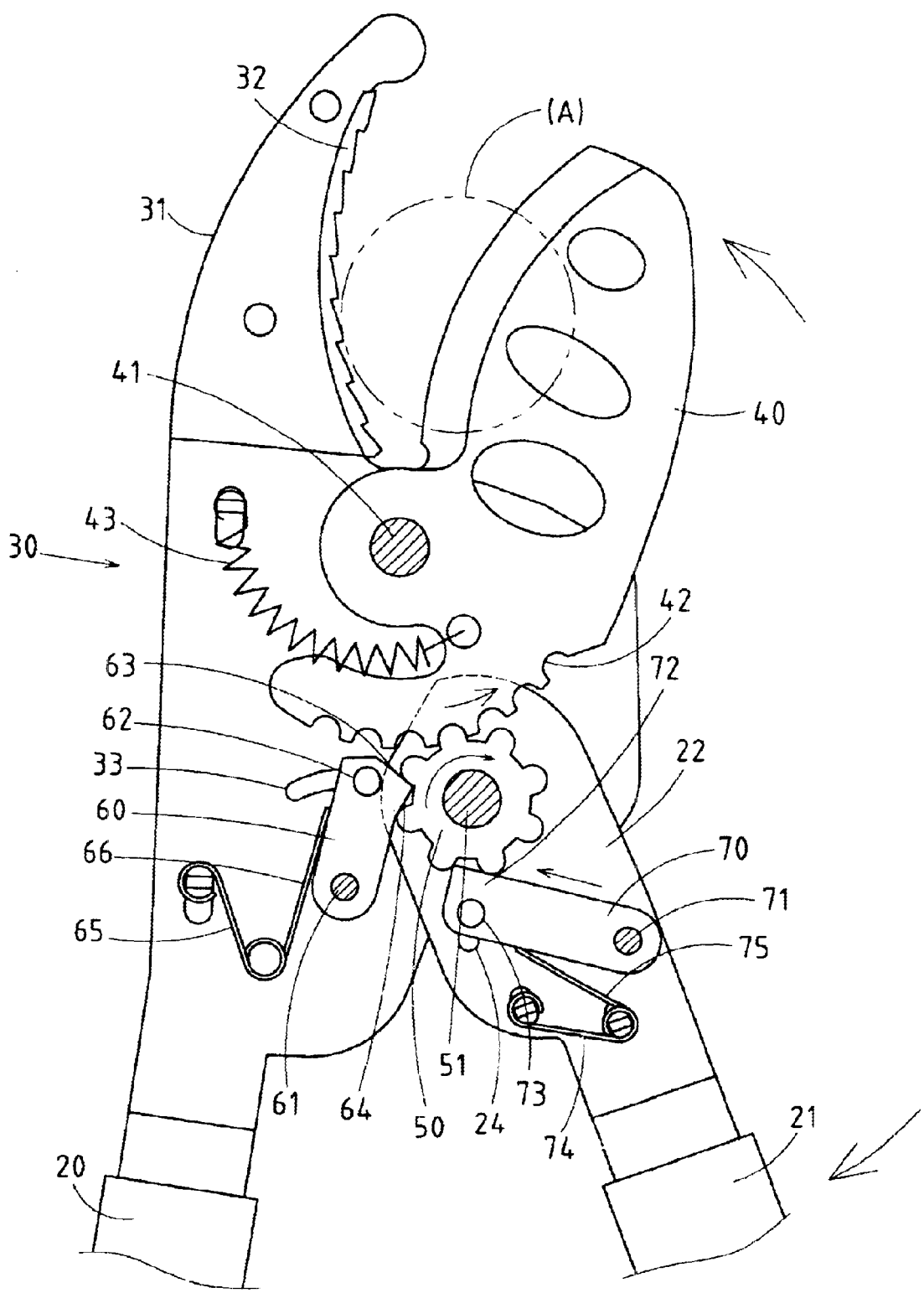
Figure 10:
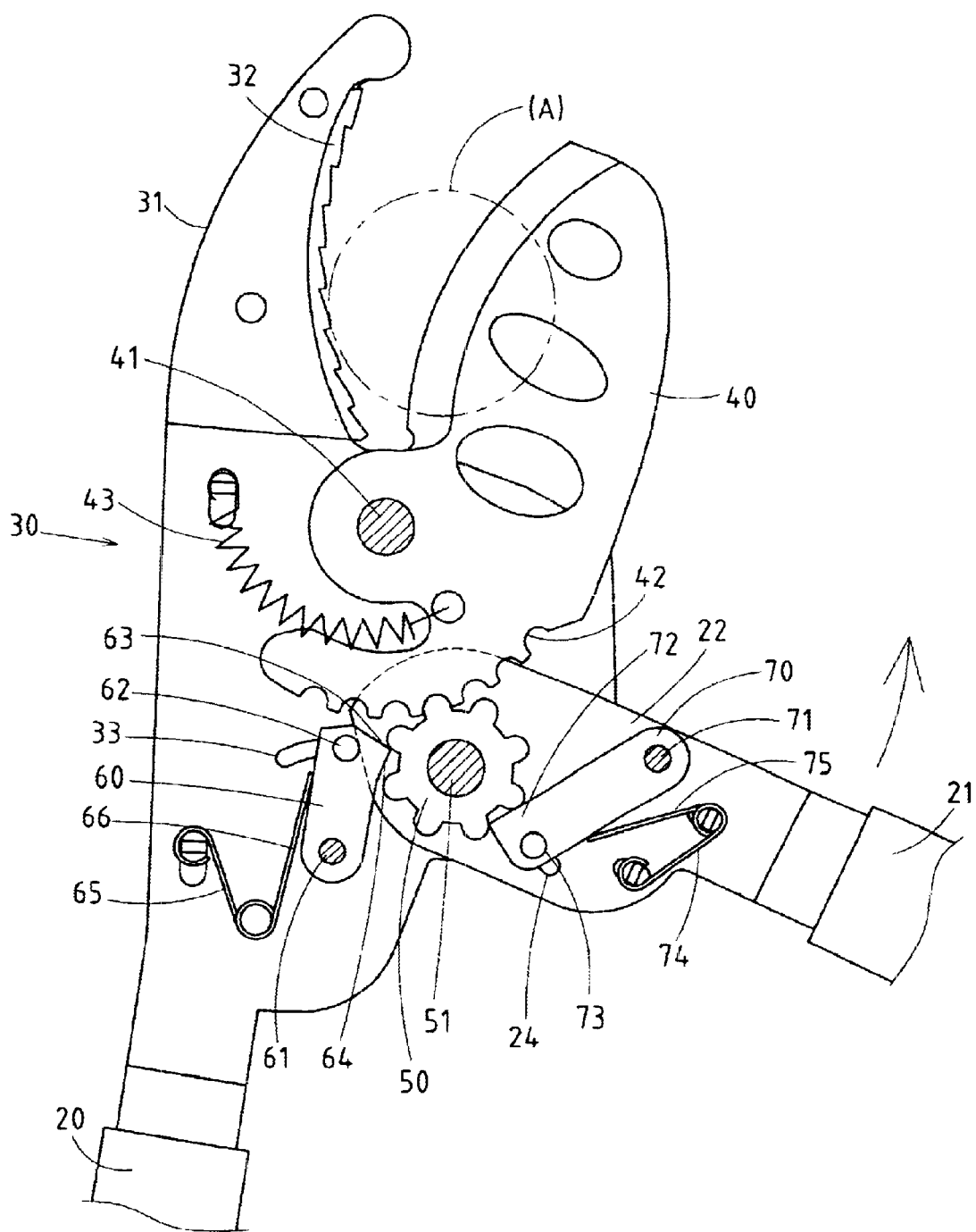

As illustrated in FIGS. 7–10, the movable jaw plate 40 is moved away from the fixed jaw plate 30 by the second handle 21 so as to accommodate a tree twig "A" to be cut. As the second handle 21 is swivelled away from the first handle 20, the push edge 23 of the top end 22 of the second handle 21 pushes the projection 62 so as to cause the check plate 60 to swivel to disengage the gear 50. In the meantime, the movable end 72 of the push plate 70 moves along an arcuate guide edge 34 of the bottom end of the fixed jaw plate 30 so as to disengage the gear 50. As a result, the recovery force of the recovery spring 43 of the movable jaw plate 40 is released to force the movable jaw plate 40 to move away from the fixed jaw plate 30. In the process of executing the scissors action to cut the tree twig "A". the second handle 21 is swivelled toward the first handle 20, thereby causing the check plate 60 and the push plate 70 to engage the gear 50 such that the gear 50 is pushed by the push plate 70 to turn clockwise on the second pivot 51. In light of the toothed edge 42 of the movable jaw plate 40 being engaged with the gear 50, the movable jaw plate 40 is actuated by the gear 50 in motion to turn counterclockwise on the first pivot 41 so as to swivel toward the fixed jaw plate 30 to bring about the scissors action in conjunction with the serrated edge 32 of the top jaw portion 31 of the fixed jaw plate 30, as shown in FIG. 9. In the event that the tree twig "A" is not successfully severed by the first scissors action as described above, the second handle 21 is swivelled in the direction away from the first handle 20, as shown in FIG. 10. In view of the fact that the push plate 70 moves past the serrated edge of the gear 50 without pushing the gear 50 to turn, and that the gear 50 is arrested by the counterclockwise stop edge 63 of the check plate 60, thereby preventing the gear 50 from turning counterclockwise. As a result, the movable jaw plate 40 remains stationary such that the cutting edge of the movable jaw plate 40 remains in the incision which is made into the tree twig "A" in the first scissors action.

Figure 11:
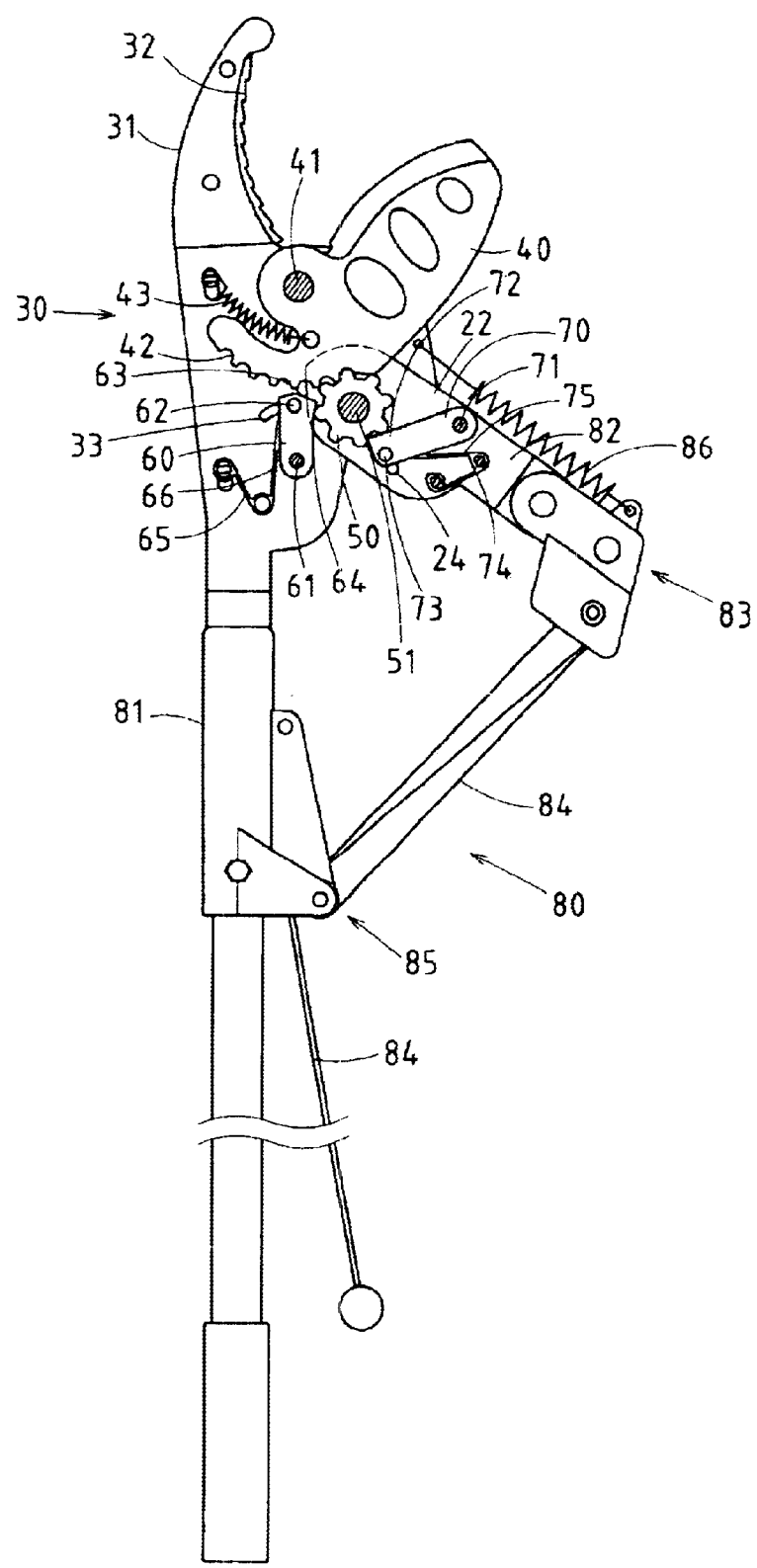
FIG. 11 shows a perspective view of another embodiment of the present invention.

As shown in FIG. 11, a tree pruner 80 of the present invention further comprises a long rod 81, and a movable end 82 which is pivoted with a first pulley 83 for a pull cord 84 to run in conjunction with a second pulley 85 which is fastened with the long rod 81. A recovery spring 86 is fastened between the first pulley 83 and the fixed jaw plate 30.

I claim:

1. A tree pruner comprising:

first handle;

a second handle comprised of, at a top end, a push edge and a second confining slot;

a fixed jaw plate comprised of two pieces identical in shape and thickness and arranged at an interval on a top end of said first handle whereby said fixed jaw plate has a top jaw portion which is comprised of a serrated edge;

a movable jaw plate fastened pivotally to said fixed jaw plate by a first pivot such that a cutting edge of said movable jaw plate is corresponding in location to said serrated edge of said fixed jaw plate, said movable jaw plate being provided at an arcuate bottom end with a tooth edge, said movable jaw plate further comprising a recovery spring which is fastened between said movable jaw plate and said fixed jaw plate;

a gear mounted rotatably on a second pivot which is pivoted to the top end of said second handle whereby said gear is engaged with said toothed edge of said movable jaw plate;

a check plate fastened pivotally to said fixed jaw plate by a third pivot and provided at a movable end with a projection which is slidably received in a first confining slot of said fixed jaw plate for confining the swiveling of said check plate such that said projection is pushed by said push edge of the top end of said second handle so as to cause said check plate to swivel, said check plate further comprising a counterclockwise stop edge, a clockwise guide edge, and a torsion spring urging at one end thereof said check plate to enable the movable end of said check plate to engage said gear, thereby enabling said gear to turn clockwise to pass said clockwise guide edge and causing said gear to be arrested by said counterclockwise stop edge and a push plate pivoted with said second handle by a fourth pivot and provided at a movable end thereof with a pillar which is slidably received in said second confining slot of the top end of said second handle so as to confine the swiveling of said push plate, said push plate further comprising a torsion spring, fastened thereto such that one end of said torsion spring urges said push plate to enable the movable end of the push plate to engage said gear;

wherein said second handle being swivelled away from said first handle so as to cause said movable jaw plate to move away from said fixed jaw plate, thereby resulting in an open space to accommodate a tree twig between said movable jaw plate and said fixed jaw plate whereby said push edge of the top end of said second handle pushes said projection of said check plate to cause said check plate to swivel to disengage said gear, with said movable end of said push plate moving along an arcuate-guide edge of a bottom end of said fixed jaw plate to become disengaged with said gear, thereby causing said movable jaw plate to be forced by said recovery spring of said movable jaw plate to move away from said fixed jaw plate;

wherein a first incision is made into the tree twig by the cutting edge of said movable jaw plate in conjunction with said serrated edge of top jaw portion of said fixed jaw plate at the time when said second handle is swivelled toward said first handle so as to cause said check plate and said push plate to engage said gear such that said gear is pushed by said push plate to turn clockwise on said second pivot, and that said gear in motion actuates said movable, jaw plate to turn counterclockwise on said first pivot to swivel toward said fixed jaw plate; and wherein said second handle being swivelled again in the direction away from said first handle in the event that the first incision fails to sever the tree twig, with said movable jaw plate remaining stationary by virtue of the fact that said gear is not pushed by said push plate to turn, and that said gear is arrested by said counterclockwise stop edge of said check plate.

\* \* \* \* \*